(12) United States Patent
Wada et al.

(10) Patent No.: US 8,177,279 B2
(45) Date of Patent: May 15, 2012

(54) VEHICULAR SEAT

(75) Inventors: Toshinao Wada, Nishikamo-gun (JP); Hiroyuki Okazaki, Chiryu (JP); Sadao Ito, Anjo (JP); Yukifumi Yamada, Toyota (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 117 days.

(21) Appl. No.: 12/443,379

(22) PCT Filed: Feb. 20, 2008

(86) PCT No.: PCT/JP2008/052845
§ 371 (c)(1), (2), (4) Date: Mar. 27, 2009

(87) PCT Pub. No.: WO2008/102800
PCT Pub. Date: Aug. 28, 2008

(65) Prior Publication Data
US 2010/0019526 A1 Jan. 28, 2010

(30) Foreign Application Priority Data
Feb. 23, 2007 (JP) ................................ 2007-044655

(51) Int. Cl.
*B60N 2/30* (2006.01)
(52) U.S. Cl. .................. 296/65.01; 296/66; 297/378.1
(58) Field of Classification Search ............... 296/65.08, 296/65.09, 65.05, 65.01, 66; 297/378.1, 297/341
See application file for complete search history.

(56) References Cited

U.S. PATENT DOCUMENTS

| | | | | |
|---|---|---|---|---|
| 3,171,682 | A * | 3/1965 | Buser et al. | 296/66 |
| 3,202,453 | A * | 8/1965 | Richards | 296/66 |
| 4,227,736 | A * | 10/1980 | Lebault et al. | 296/65.09 |
| 6,183,033 | B1 * | 2/2001 | Arai et al. | 296/65.09 |
| 6,196,613 | B1 * | 3/2001 | Arai | 296/65.13 |
| 6,371,556 | B1 * | 4/2002 | Arai | 297/331 |
| 6,588,823 | B1 * | 7/2003 | Carlsson et al. | 296/65.01 |

(Continued)

FOREIGN PATENT DOCUMENTS
DE 10 2005 20 334 A1 11/2006
(Continued)

OTHER PUBLICATIONS

European Search Report dated Jan. 7, 2010 (5 pages).

*Primary Examiner* — Glenn Dayoan
*Assistant Examiner* — Pinel Romain
(74) *Attorney, Agent, or Firm* — Sughrue Mion, PLLC

(57) ABSTRACT

To be able to store a seat back and a seat cushion in line from front to back and be able to widely ensure space above a storage position of the seat cushion.

In a rear seat (10), when a seat back (18) is rotated to a forwardly collapsed position in a state where a seat cushion (16) has been moved to a storage position, the seat back (18) and the seat cushion (16) are stored in parallel from front to back. Consequently, the seat back (18) and the seat cushion (16) can be thinly stored in an up-down direction of a vehicle. Moreover, the storage position of the seat cushion (16) is set on a rear lower side of a use position, so space above the storage position can be widely ensured.

15 Claims, 9 Drawing Sheets

U.S. PATENT DOCUMENTS

| | | | |
|---|---|---|---|
| 6,916,057 B2 * | 7/2005 | Teich | 296/65.08 |
| 6,997,500 B2 * | 2/2006 | Horsford et al. | 296/66 |
| 7,188,883 B2 * | 3/2007 | Van Dyk et al. | 296/65.01 |
| 2003/0098592 A1 | 5/2003 | Nygren et al. | |

FOREIGN PATENT DOCUMENTS

| | | |
|---|---|---|
| EP | 1 316 468 A1 | 6/2003 |
| EP | 1 526 035 A2 | 4/2005 |
| EP | 1 745 978 A1 | 1/2007 |
| EP | 1 992 519 A2 | 11/2008 |
| FR | 2 804 072 A1 | 7/2001 |
| FR | 2 826 321 A1 | 12/2002 |
| JP | 60-054632 U | 4/1985 |
| JP | 2000-343994 A | 12/2000 |
| JP | 2000-351345 A | 12/2000 |
| JP | 2004-330915 A | 11/2004 |
| JP | 2004-359158 A | 12/2004 |

* cited by examiner

VEHICULAR SEAT

TECHNICAL FIELD

The present invention relates to a vehicular seat.

BACKGROUND ART

Conventionally, in rear seats for automobiles (e.g., see Patent Document 1), there is known a rear seat of a configuration where a seat back and a seat cushion are stored in line from front to back. In this rear seat, the seat cushion that has been disposed on a high step portion of a stepped floor is moved to a storage position that is disposed below a rear deck, and the seat back is collapsed frontward of the seat cushion.
Patent Document 1: JP-A No. 2000-343994

DISCLOSURE OF THE INVENTION

Problem that the Invention is to Solve

However, the rear seat of the above-described configuration has a configuration where the seat cushion is slid horizontally using slide rails. For this reason, the normal use position and the storage position of the seat cushion are set to the same height, and the space above the storage position (i.e., cargo compartment space above the rear deck) becomes narrow.

In consideration of the above-described circumstance, it is an object of the present invention to obtain a vehicular seat where the seat back and the seat cushion can be stored in line from front to back and which can widely ensure the space above the storage position of the seat cushion.

Means for Solving the Problem

A vehicular seat pertaining to an invention according to claim 1 comprises: a seat cushion for seating a passenger; a support mechanism that is configured to include a link member, one end side of which is rotatably coupled to the seat cushion and the other end side of which is rotatably coupled to a vehicle body floor, and which supports the seat cushion with respect to the vehicle body floor such that the seat cushion is movable between a use position where a passenger is capable of sitting on the seat cushion and a storage position that is set on a rear lower side of the use position; and a seat back that is supported on the vehicle body floor such that the seat back is rotatable between an upright position where the seat back supports the back of a passenger who is seated on the seat cushion that has been disposed in the use position and a forwardly collapsed position where the seat back is disposed in line in front of the seat cushion that has been moved to the storage position.

It will be noted that "front", "rear" and "lower" in claim 1 represent the directionality of the vehicular seat pertaining to the invention according to claim 1 and do not have to be the same as the directionality of the vehicle.

In the vehicular seat according to claim 1, the link member of the support mechanism rotates rearward when the seat cushion is moved from the use position to the storage position, so the seat cushion necessarily moves to a more rear lower side than the use position. When the seat back is rotated to the forwardly collapsed position in a state where the seat cushion has been moved to the storage position, the seat back is disposed (stored) in line in front of the seat cushion. Thus, the storage position of the seat cushion is set on the rear lower side of the use position, so the space above the storage position can be widely ensured. Moreover, the support mechanism that supports the seat cushion such that the seat cushion is movable between the use position and the storage position is configured to include the link member (a member that rotates by the movement of the seat cushion) that is rotatably coupled to the seat cushion and the vehicle body floor. For this reason, the movement of the seat cushion can be easily automated by, for example, adding means (a motor or urging member) that imparts rotational force to the link member.

A vehicular seat pertaining to an invention according to claim 2 comprises the vehicular seat according to claim 1, wherein the link member is disposed along the vehicle body floor in a state where the seat cushion has been moved to the storage position.

In the vehicular seat according to claim 2, when the seat cushion is moved to the storage position, the link member is disposed along the vehicle body floor. Consequently, a situation where the link member becomes an obstacle in the stored state of the seat cushion can be controlled.

A vehicular seat pertaining to an invention according to claim 3 comprises the vehicular seat according to claim 1 or claim 2, further comprising a holding mechanism that holds the seat cushion in the use position and is capable of releasing the hold and an urging member that urges the seat cushion toward the storage position.

In the vehicular seat according to claim 3, when the holding of the seat cushion in the use position by the holding mechanism is released, the seat cushion is moved to the storage position by the urging force of the urging member. Consequently, the seat cushion can be moved to the storage position by a simple operation.

A vehicular seat pertaining to an invention according to claim 4 comprises the vehicular seat according to claim 3, wherein the seat cushion includes a cushion frame that serves as a skeleton member, a rod portion that configures the skeleton of the seat cushion together with the cushion frame is disposed on the one end side of the link member, one end side of the urging member is locked to the rod portion, and the other end side of the urging member is locked to the cushion frame.

In the vehicular seat according to claim 4, the rod portion that is disposed on the one end side of the link member configures the skeleton of the seat cushion together with the cushion frame. Consequently, the structure of the cushion frame that serves as a skeleton member can be simplified. Moreover, the seat cushion is urged toward the storage position by the urging member, one end side of which is locked to the rod portion of the link member and the other end side of which is locked to the cushion frame. Consequently, the seat cushion can be urged toward the storage position by a simple configuration.

A vehicular seat pertaining to an invention according to claim 5 comprises the vehicular seat according to any one of claim 1 to claim 4, wherein the one end side of the link member is coupled to a front end portion of the seat cushion, and the support mechanism includes projections that are disposed on both left and right sides of a rear end portion of the seat cushion and guide members that are disposed on both left and right sides of the seat cushion, are attached to the vehicle body floor, and in which are formed guide grooves into which the projections fit such that the projections are relatively movable.

In the vehicular seat according to claim 5, the projections that are disposed on both the left and right sides of the rear end portion of the seat cushion move along the guide grooves in the guide members that are disposed on both the left and right sides of the seat cushion and are attached to the vehicle body floor, whereby the movement of the rear end portion of the seat cushion is guided between the use position and the storage position. In this manner, because the movement of the rear end portion of the seat cushion is guided by the projections and the guide grooves, the locus of movement of the rear end portion of the seat cushion can be set to an optimum locus of movement by appropriately setting and changing the shapes of the guide grooves.

A vehicular seat pertaining to an invention according to claim 6 comprises the vehicular seat according to claim 5, wherein the guide members include a pair of wall portions that face each other in a left-right direction, with the guide grooves being formed in one wall and with the seat back being supported on the other wall via a reclining mechanism that is disposed between both walls.

In the vehicular seat according to claim 6, the guide grooves that guide the movement of the seat cushion are formed in the one wall of the guide members, and the seat back is supported on the other wall via the reclining mechanism that is disposed between both walls. Consequently, an appropriate disposition where there is no danger of interfering while the seat cushion and the seat back are in the middle of moving can be realized with little space.

A vehicular seat pertaining to an invention according to claim 7 comprises the vehicular seat according to any one of claim 1 to claim 6, wherein the storage position is set on a lower side of a deck board that configures a floor of a cargo compartment.

In the vehicular seat according to claim 7, the storage position of the seat cushion is set on the lower side of the deck board that configures the floor of the cargo compartment. For this reason, in a state where the seat back has been disposed in line in front of the seat cushion that has been disposed in the storage position (a state where the cargo compartment has been expanded), the upper surface of the deck board and the back surface of the seat back configure the floor of the cargo compartment. Consequently, a situation where dirt or the like on cargo that is placed in the cargo compartment adheres to the surfaces of the seat back and the seat cushion can be prevented or controlled.

Effects of the Invention

As described above, in the vehicular seat of the invention pertaining to claim 1, the seat cushion can be stored in line in back of the seat back, and the space above the storage position of the seat cushion can be widely ensured.

In the vehicular seat of the invention pertaining to claim 2, a situation where the link member becomes an obstacle in the stored state of the seat cushion can be controlled.

In the vehicular seat of the invention pertaining to claim 3, the seat cushion can be moved to the storage position by a simple operation.

In the vehicular seat of the invention pertaining to claim 4, the configuration of the cushion frame can be simplified, and the seat cushion can be urged toward the storage position by a simple configuration.

In the vehicular seat of the invention pertaining to claim 5, the locus of movement of the rear end portion of the seat cushion can be set to an optimum locus of movement.

In the vehicular seat of the invention pertaining to claim 6, an appropriate disposition where there is no danger of interfering while the seat cushion and the seat back are in the middle of moving can be realized with little space.

In the vehicular seat of the invention pertaining to claim 7, a situation where dirt or the like on cargo that is placed in the cargo compartment adheres to the surfaces of the seat back and the seat cushion can be prevented or controlled.

BEST MODE FOR IMPLEMENTING THE INVENTION

Figure 1:
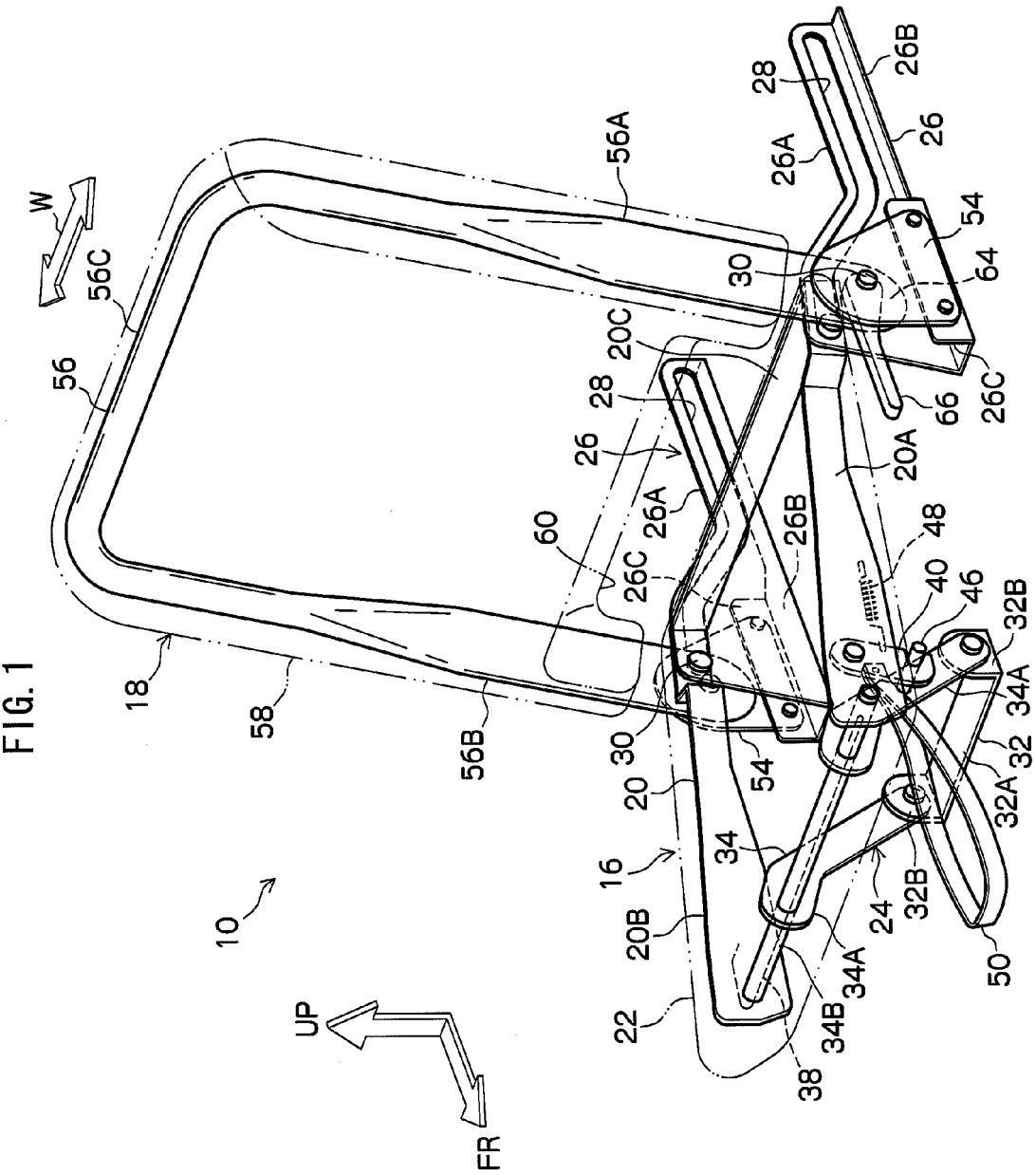
FIG. 1 A perspective view showing the configuration of relevant portions of a rear seat pertaining to an embodiment of the present invention and showing a state where a seat cushion has been disposed in a use position and where a seat back has been disposed in an upright position.
Figure 2:
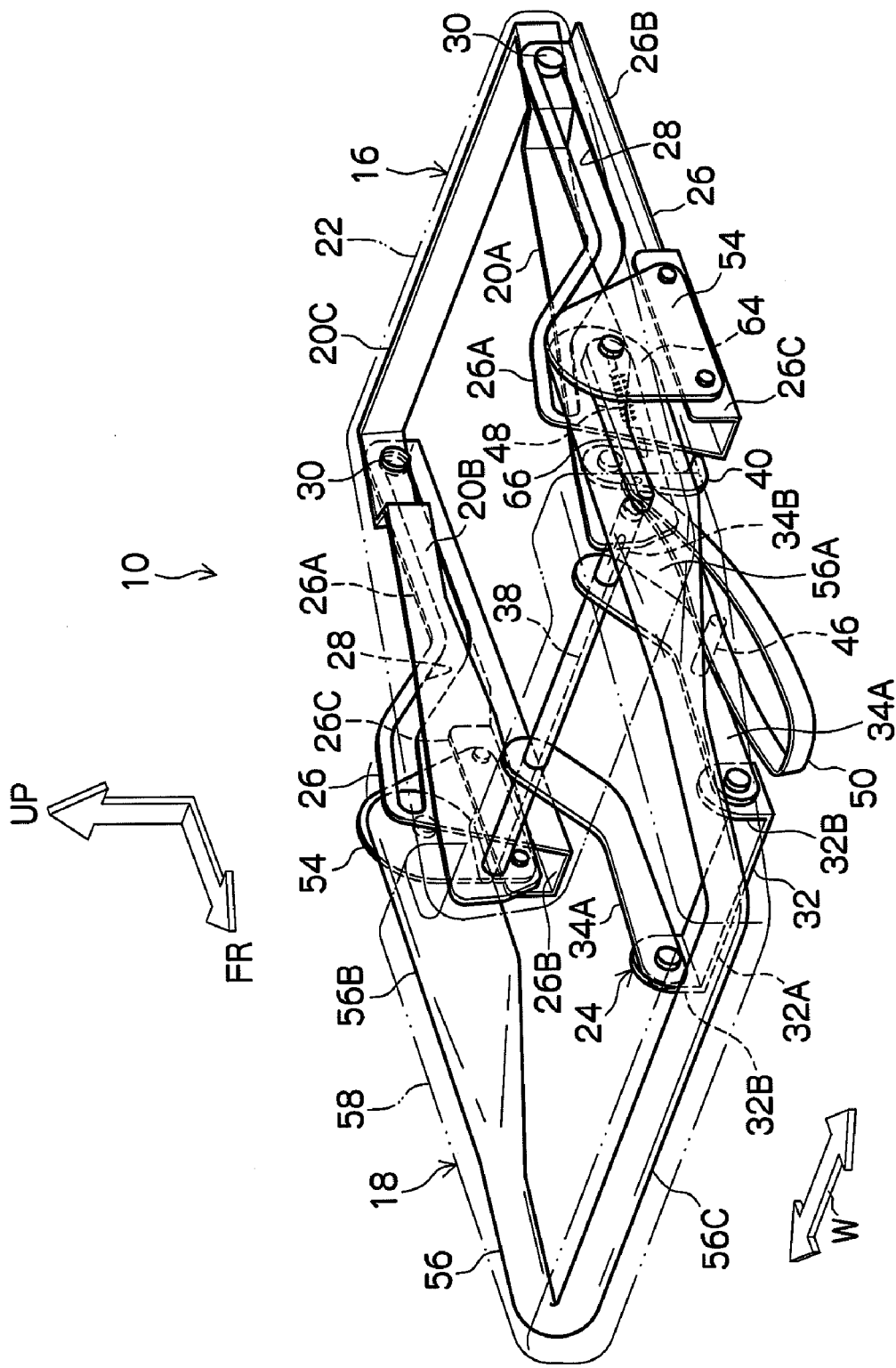
FIG. 2 A perspective view showing the configuration of relevant portions of the rear seat pertaining to the embodiment of the present invention and showing a state where the seat cushion has been disposed in a storage position and where the seat back has been disposed in a forwardly collapsed position.

In FIG. 1 and FIG. 2, there is shown, in perspective views, the configuration of relevant portions of a rear seat 10 that serves as a vehicular seat pertaining to the embodiment of the present invention. Further, in FIG. 3 and FIG. 4, there is shown, in side views, the configuration of relevant portions of this rear seat 10. It will be noted that, in the drawings, arrow FR represents a vehicle front direction, arrow UP represents a vehicle up direction and arrow W represents a vehicle width direction.

Figure 3:
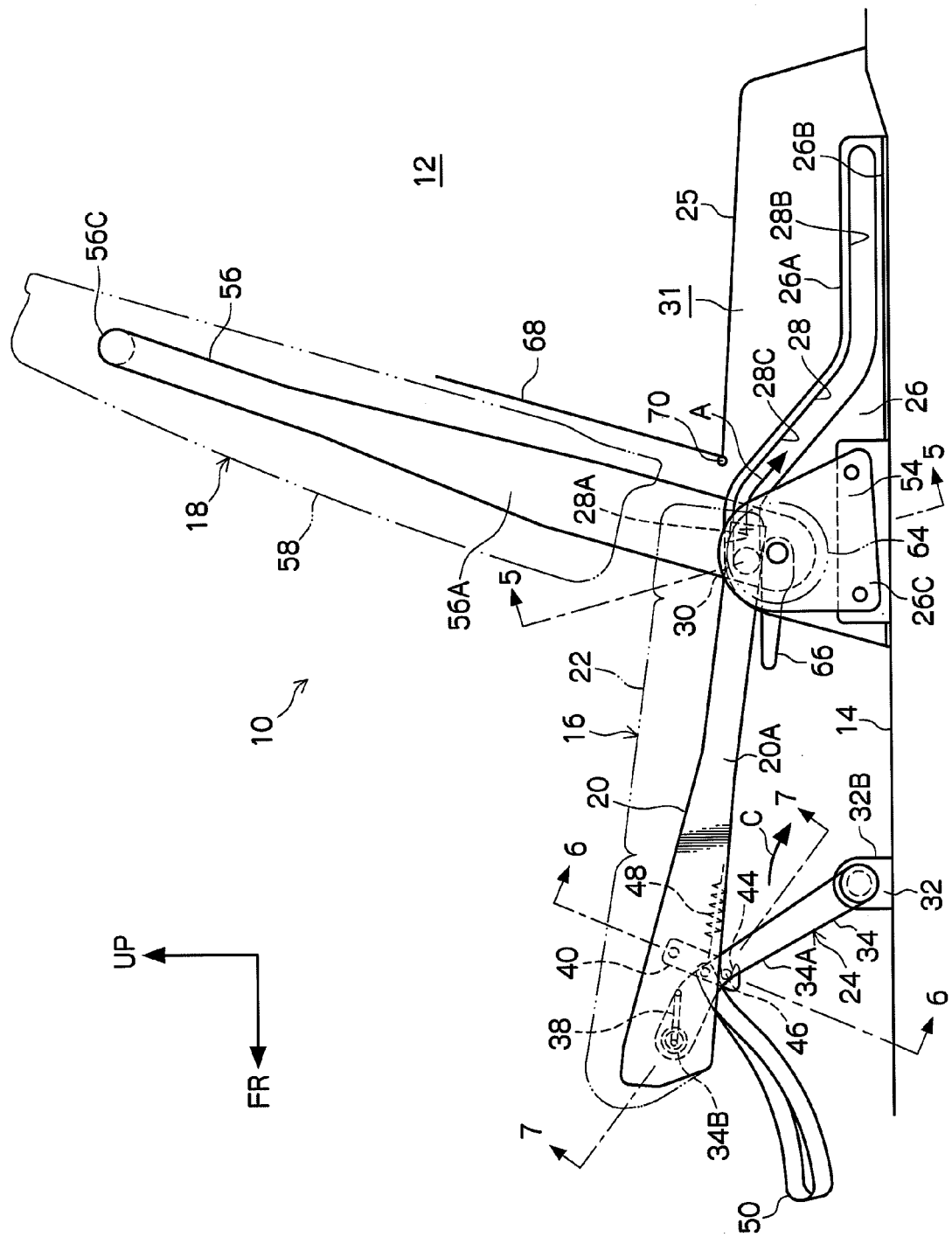
FIG. 3 A side view showing the configuration of relevant portions of the rear seat pertaining to the embodiment of the present invention and showing a state where the seat cushion has been disposed in the use position and where the seat back has been disposed in the upright position.
Figure 4:
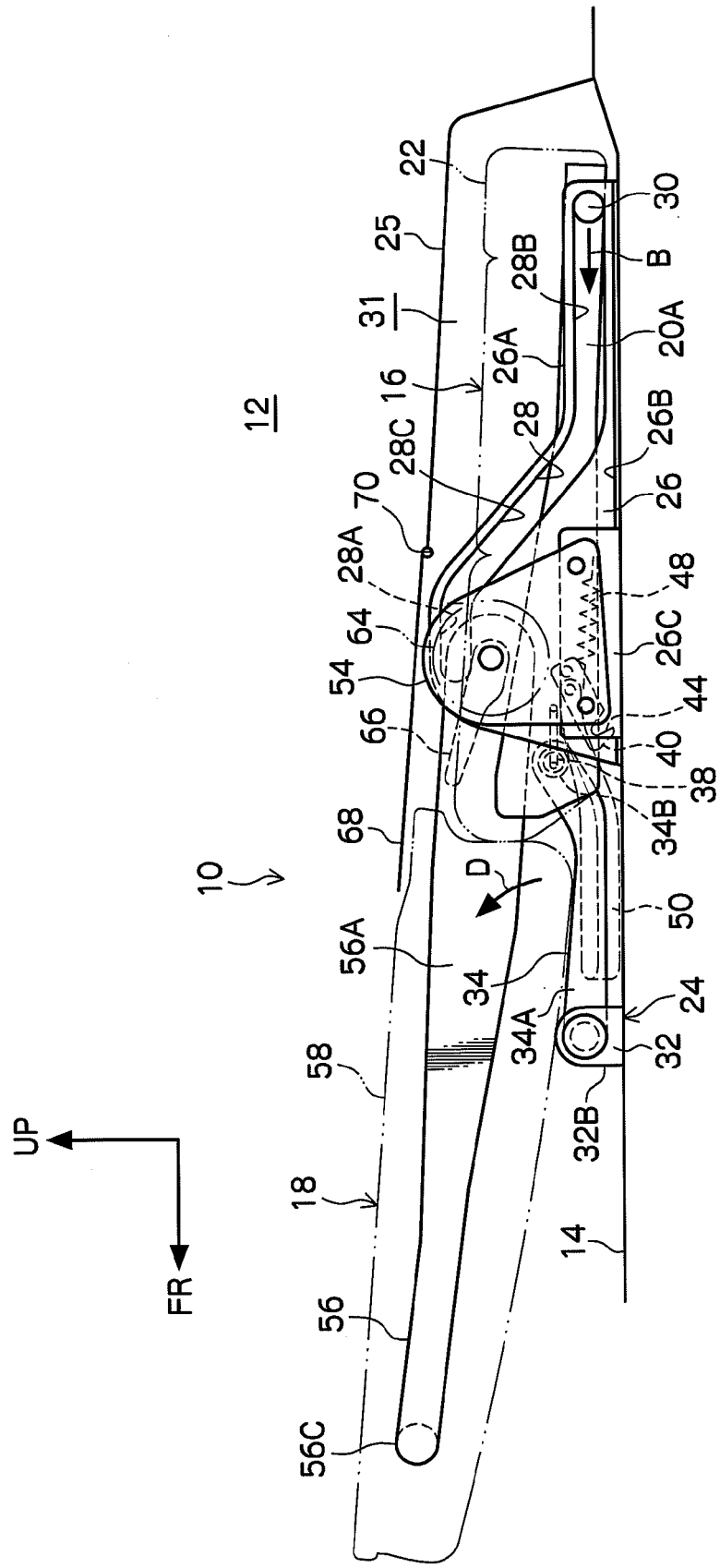
FIG. 4 A side view showing the configuration of relevant portions of the rear seat pertaining to the embodiment of the present invention and showing a state where the seat cushion has been disposed in the storage position and where the seat back has been disposed in the forwardly collapsed position.

The rear seat 10 pertaining to the embodiment of the present invention is a seat in a rearmost portion of an unillustrated automobile (e.g., a so-called van type or minivan type of automobile) and, as shown in FIG. 3 and FIG. 4, is installed on the upper portion of a floor 14 (vehicle body floor) that is formed flatly overall. It will be noted that, in the present embodiment, the directionality of front, rear, left, right, up and down of the rear seat 10 coincides with the directionality of front, rear, left, right, up and down of the automobile in which this rear seat 10 is installed.

This rear seat 10 includes a seat cushion 16 for seating a passenger and a seat back 18 that supports the back of a passenger who is seated on this seat cushion 16. The seat cushion 16 includes a cushion frame 20 that serves as a skeleton member that configures the skeleton of the seat cushion 16. The cushion frame 20 is disposed with a pair of left and right extension portions 20A and 20B that extend along the front-rear direction inside both width direction side portions of the seat cushion 16. The pair of extension portions 20A and 20B are formed in plate shapes and are disposed in a state where their plate thickness direction is along the vehicle width direction. The rear end portions of the pair of extension portions 20A and 20B are coupled together by a plate-shaped coupling portion 20C that extends along the vehicle width direction, and the cushion frame 20 is formed in a substantial U shape when seen from above.

An elastically deformable cushion pad is attached via a cushion pan (both of which are not shown) to this cushion frame 20, and the surface of the cushion pad is covered by a surface material 22.

The seat cushion 16 of the above-described configuration is coupled to the floor 14 via a link mechanism 24 and a pair of rails 26 (guide members) that configure a support mechanism, and the seat cushion 16 is configured to be movable between a use position (the position shown in FIG. 1 and FIG. 3) where a passenger is capable of sitting on the seat cushion 16 and a storage position (the position shown in FIG. 2 and FIG. 4) that is set in back of this use position on the lower side (a position lower than the use position) of a deck board 25 that configures the floor of a cargo compartment 12 (it will be noted that, below, the space on the lower side of the deck board 25 will be called a storage compartment 31). As shown, a top surface of the seat cushion 16 faces upward in both the use position and the storage position.

The pair of rails 26 are for coupling the rear end portion of the seat cushion 16 to the floor 14 and are disposed on both the left and right sides of the storage compartment 31 (the rear lower side of the seat cushion 16 that has been disposed in the use position). These rails 26 include vertical walls 26A (one wall) that are respectively formed in plate shapes. These vertical walls 26A are formed so as to be long along the vehicle front-rear direction and are disposed so as to face the side portions of the seat cushion 16 in a state where the seat cushion 16 has been disposed in the storage position.

Fixing pieces 26B extend from the lower end portions of the vertical walls 26A toward the opposite side of the seat cushion 16. These fixing pieces 26B are fastened to the floor 14 by unillustrated fasteners, whereby the rails 26 are attached to the floor 14.

Further, guide grooves 28 (long holes) that are formed in substantial crank shapes are formed in the vertical walls 26A. Each of the guide grooves 28 includes a first horizontal portion 28A that is disposed in the front end portion of the vertical wall 26A, a second horizontal portion 28B that is disposed in the rear end side of the vertical wall 26A and a slanted portion 28C that is disposed between the first horizontal portion 28A and the second horizontal portion 28B. The second horizontal portion 28B extends substantially horizontally with respect to the floor 14 in the vicinity of the floor 14, and the first horizontal portion 28A is disposed in a higher position than the second horizontal portion 28B and extends substantially horizontally with respect to the floor 14. Further, the slanted portion 28C slants in a rearward descending state with respect to the floor 14.

Figure 5:
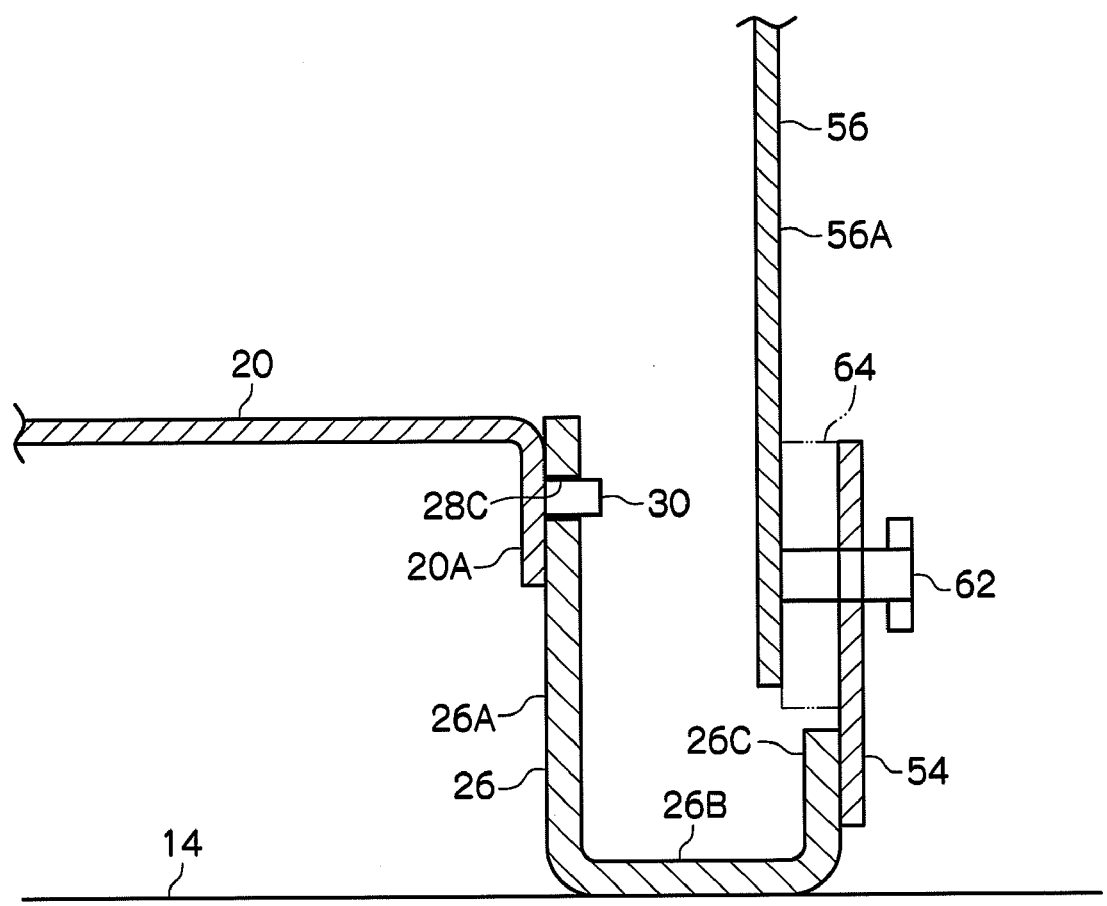
FIG. 5 A cross-sectional view along line 5-5 in FIG. 3.

Projections 30 that are disposed on both the left and right sides of the rear end portion of the cushion frame 20 fit into the guide grooves 28 in the vertical walls 26A such that the projections 30 are relatively movable (see FIG. 5). Thus, the rear end portion of the seat cushion 16 is coupled to the floor 14 via the rails 26. The moving direction of the rear end portion of the seat cushion 16 is guided as a result of the projections 30 moving along the guide grooves 28.

That is, in a state where the seat cushion 16 has been disposed in the use position, the projections 30 are disposed in the first horizontal portions 28A and the rear end portion of the seat cushion 16 is away from the floor 14. When the seat cushion 16 is moved toward the rear side of the vehicle (toward the storage position) from this state, the projections 30 move along the slanted portions 28C, whereby the rear end portion of the seat cushion 16 is lowered toward the floor 14 (see arrow A in FIG. 3). When the projections 30 enter the second horizontal portions 28B from the slanted portions 28C and are moved along the second horizontal portions 28B, the rear end portion of the seat cushion 16 is moved horizontally with respect to the floor 14. Then, when the projections 30 contact the inner peripheries of the rear end portions of the second horizontal portions 28B, movement of the seat cushion 16 toward the rear side of the vehicle is limited, and the seat cushion 16 is disposed in the storage position (the state shown in FIG. 2 and FIG. 4).

Further, when the seat cushion 16 that has been disposed in the storage position is moved toward the front side of the vehicle (see arrow B in FIG. 4), the projections 30 move along the slanted portions 28C, whereby the rear end portion of the seat cushion 16 is moved away (raised) from the floor 14. Then, when the projections 30 enter the first horizontal portions 28A from the slanted portions 28C and contact the inner peripheries of the front end portions of the first horizontal portions 28A, movement of the seat cushion 16 toward the front side of the vehicle is limited, and the seat cushion 16 is disposed in the use position (the state shown in FIG. 1 and FIG. 3).

The aforementioned link mechanism 24 is for coupling the front end portion of the seat cushion 16 to the floor 14 and includes a fixing member 32 that is fixed to the floor 14. As shown in FIG. 1 and FIG. 2, the fixing member 32 is disposed with a body portion 32A that is formed in a plate shape that is long along the vehicle width direction, and this body portion 32A is fastened to the floor 14 by an unillustrated fastener. Plate-shaped coupling pieces 32B extend upward from both longitudinal direction end portions of the body portion 32A. A link member 34 is coupled to these coupling pieces 32B.

The link member 34 is disposed with a pair of arm portions 34A that are formed in long plate shapes. One longitudinal direction end portion of each of these arm portions 34A is rotatably coupled to the coupling pieces 32B via a support rod. The other longitudinal direction end portion of each of the pair of arm portions 34A is fixed in a state where a torque rod 34B (rod portion) formed in a pipe shape is passed therethrough, and the pair of arm portions 34A are coupled together by this torque rod 34B. One axial line direction end portion of the torque rod 34B is rotatably coupled to the front end portion of the one extension portion 20A of the cushion frame 20, and the other axial line direction end portion of the torque rod 34B is rotatably coupled to the front end portion of the other extension portion 20B. This torque rod 34B configures the skeleton of the seat cushion 16 together with the cushion frame 20.

The link member 34 of the above-described configuration is configured to stand upright between the seat cushion 16 and the floor 14 and support the seat cushion 16 in the use position in a state where the seat cushion 16 has been disposed in the use position. Further, when the seat cushion 16 is moved from the use position to the storage position, the link member 34 is moved (rotated) toward the rear side of the vehicle together with the seat cushion 16, whereby the moving direction of the front end portion of the seat cushion 16 is guided (see arrow C in FIG. 3).

That is, the front end portion of the seat cushion 16 is moved along the rotational locus of the torque rod 34B resulting from the link member 34, so the link member 34 is lowered toward the floor 14 as it collapses toward the rear side of the vehicle. Then, when the link member 34 completely collapses on the rear side of the fixing member 32 (when the link member 34 is disposed along the vehicle floor 14), the seat cushion 16 is disposed in the storage position (the state shown in FIG. 2 and FIG. 4).

Further, when the seat cushion 16 is moved from the storage position to the use position, the front end portion of the seat cushion 16 is raised as the link member 34 is stood upright toward the front side of the vehicle (see arrow D in FIG. 4). Then, movement of the seat cushion 16 toward the front side of the vehicle is limited by the aforementioned rails 26 (guide grooves 28), whereby rotation of the link member 34 is limited and the seat cushion 16 is disposed in the use position (the state shown in FIG. 1 and FIG. 3).

Moreover, the rear seat 10 pertaining to the present embodiment includes a torsion spring 38 (urging member) that urges the seat cushion 16 toward the storage position and a holding mechanism that holds the seat cushion 16 in the use position.

Figure 6:
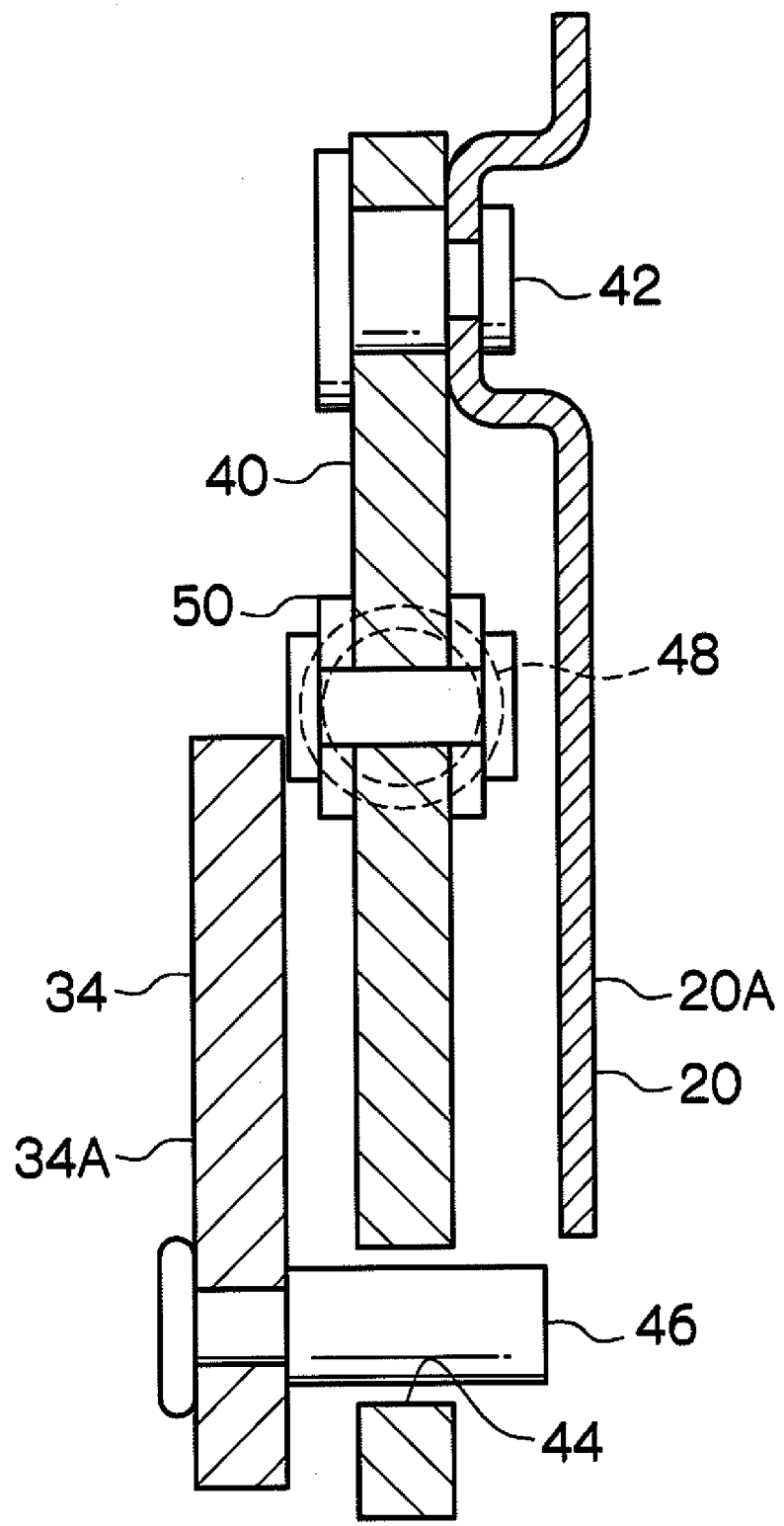
FIG. 6 A cross-sectional view along line 6-6 in FIG. 3.
Figure 7:
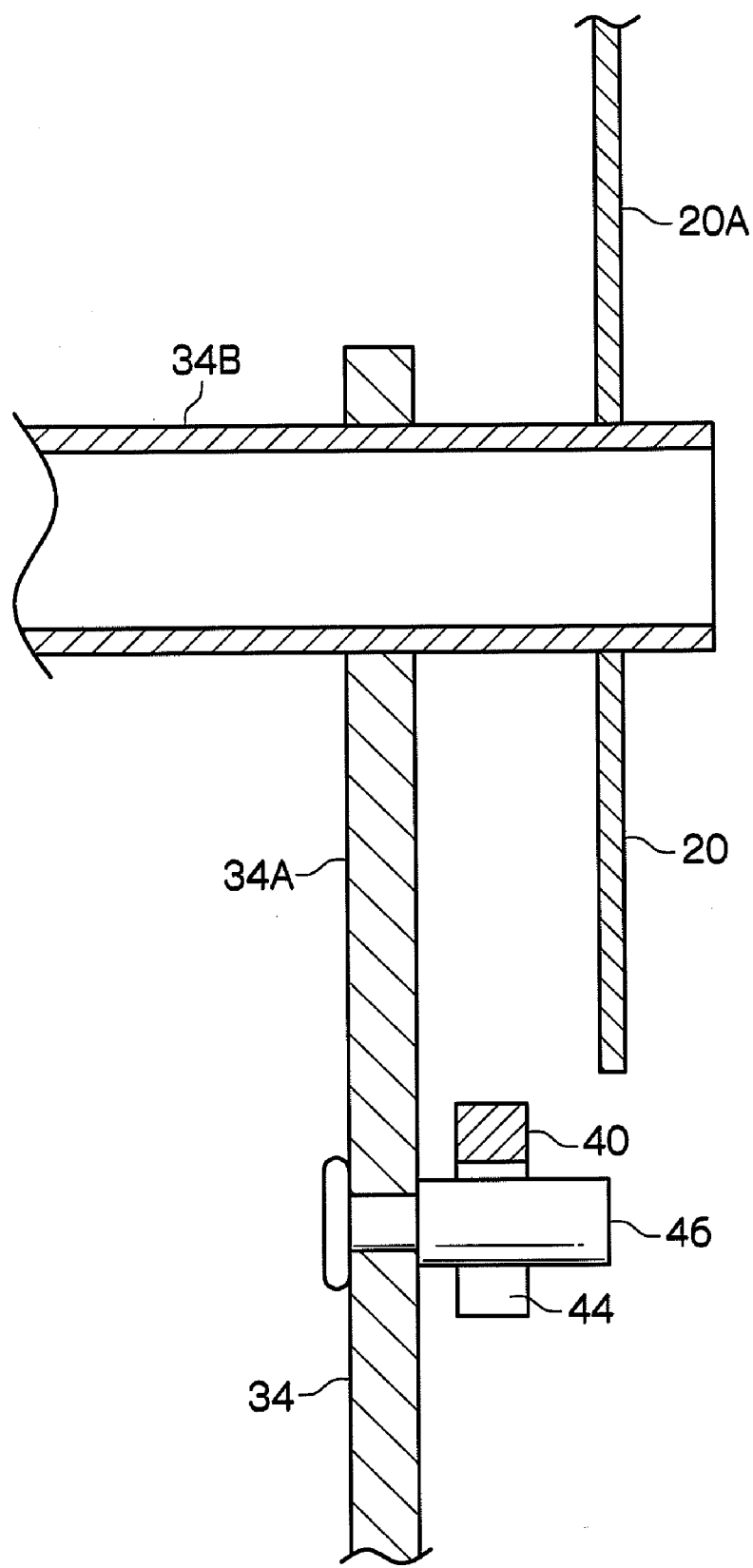
FIG. 7 A cross-sectional view along line 7-7 in FIG. 3.

The aforementioned holding mechanism includes a ratchet 40 that is formed in a long plate shape. As shown in FIG. 6, one longitudinal direction end portion (upper end portion) of this ratchet 40 is rotatably coupled to the one extension portion 20A of the cushion frame 20 via a support rod 42. Further, a cutout 44 that opens to one width direction side (rear side of the vehicle, one side in the rotational direction) of the ratchet 40 is formed in the other longitudinal direction end portion (lower end portion) of the ratchet 40. A circular column-shaped lock-use projecting portion 46 that is disposed on one of the arm portions 34A of the link member 34 fits into this cutout 44 in a state where the seat cushion 16 has been disposed in the use position (see FIG. 7).

Moreover, as shown in FIG. 3, a tension coil spring 48 is disposed between the ratchet 40 and the one extension portion 20A, and this tension coil spring 48 urges the ratchet 40 toward the rear side of the vehicle (in the direction where the lock-use projecting portion 46 fits into the cutout 44). In a state where the lock-use projecting portion 46 is fitted into the cutout 44 in the ratchet 40, rotation of the link member 34 is limited; thus, the seat cushion 16 is held in the use position.

It will be noted that a strap member 50 is coupled to the longitudinal direction intermediate portion of the ratchet 40, and when this strap member 50 is pulled toward the front side of the vehicle counter to the urging force of the tension coil spring 48, the ratchet 40 is rotated toward the front side of the vehicle such that the fitted state between the cutout 44 and the lock-use projecting portion 46 is released. When the fitted state between the cutout 44 and the lock-use projecting portion 46 is released in this manner, rotation of the link member 34 toward the rear side of the vehicle becomes possible such that the seat cushion 16 can move to the storage position.

Figure 8:
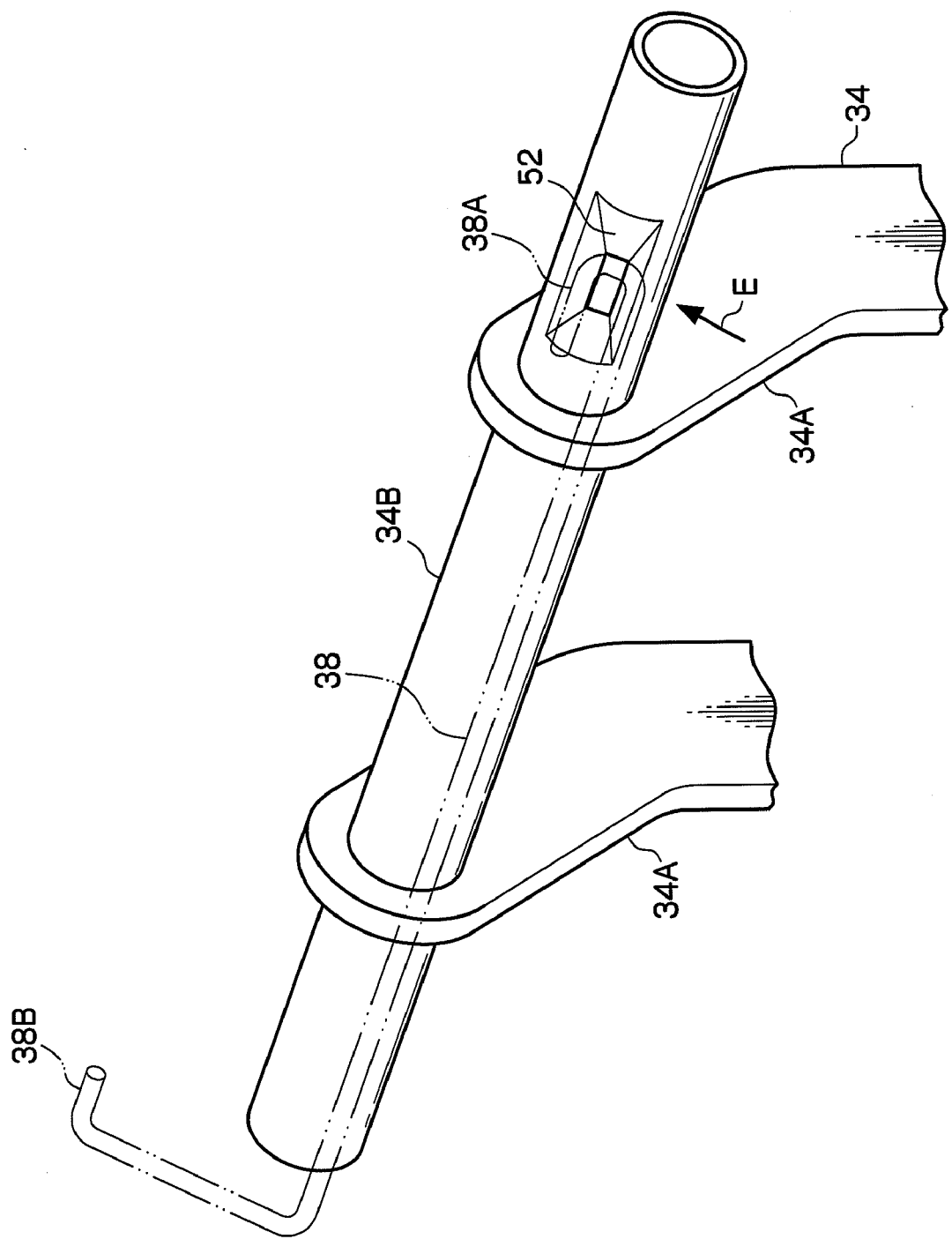
FIG. 8 A perspective view showing the partial configuration of a link member that is a configural member of the rear seat pertaining to the embodiment of the present invention.
Figure 9:
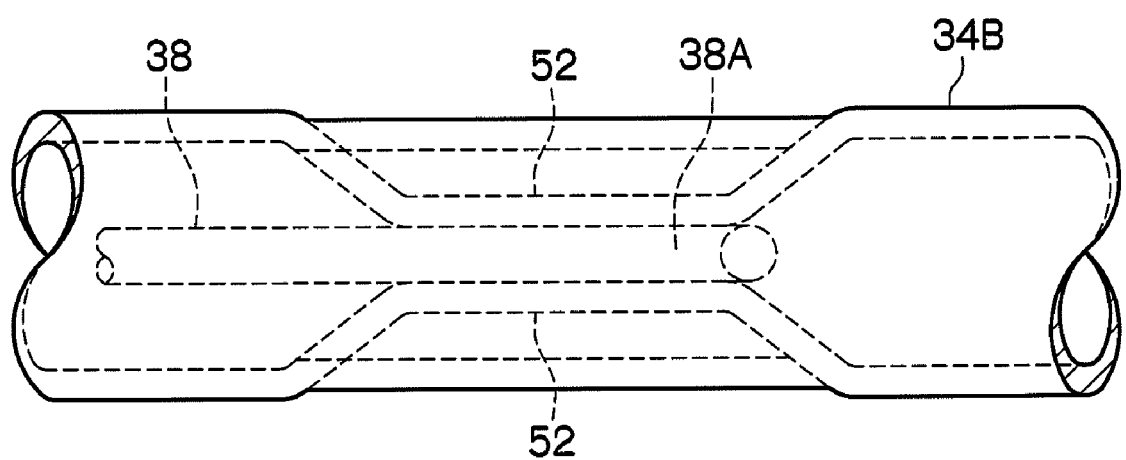
FIG. 9 A diagram showing, as seen from the direction of arrow E in FIG. 8, the partial configuration of the link member that is a configural member of the rear seat pertaining to the embodiment of the present invention.

The aforementioned torsion spring 38 is formed in a long rod shape by a spring material and, as shown in FIG. 8, one longitudinal direction end side and the longitudinal direction intermediate portion thereof are inserted (inset) inside the torque rod 34B of the link member 34. One longitudinal direction end portion of the torsion spring 38 is bent in a substantial U shape, and a one end side locking portion 38A for locking the torsion spring 38 to the torque rod 34B is formed. As shown in FIG. 9, crush working is administered to a position of the torque rod 34B that corresponds to the one end side locking portion 38A such that a pair of crushed portions 52 are formed, and the one end side locking portion 38A is held between the pair of crushed portions 52. Thus, relative rotation of the one longitudinal direction end portion of the torsion spring 38 with respect to the torque rod 34B is limited.

Further, the other longitudinal direction end side of the torsion spring 38 that projects outside the torque rod 34B is bent in a substantial U shape, and another end side locking portion 38B is formed on the other longitudinal direction end portion of the torsion spring 38. This other end side locking portion 38B is locked to the other extension portion 20B of the cushion frame 20.

This torsion spring 38 is twisted as a result of the link member 34 rotating relatively with respect to the cushion frame 20 when the seat cushion 16 is moved from the storage position to the use position; thus, the torsion spring 38 urges the seat cushion 16 that has been disposed in the use position toward the storage position.

Plate-shaped coupling pieces 26C that extend upward from the end portions on the front end sides of the fixing pieces 26B on the opposite sides of the vertical walls 26A are disposed on the aforementioned rails 26. The coupling pieces 26C are coupled and fixed in a state where the lower end portions of coupling plates 54 (other wall, guide members) that are formed in plate shapes overlap them in the plate thickness direction. These coupling plates 54 are for supporting the aforementioned seat back 18 on the floor 14 and face the vertical walls 26A (one wall) along the left-right direction of the rear seat 10.

The seat back 18 includes a back frame 56 that serves as a skeleton member that configures the skeleton of the seat back 18. The back frame 56 is disposed with a pair of plate-shaped side portions 56A and 56B, which are disposed inside both width direction side portions of the seat back 18 and extend in the height direction of the seat back 18, and a pipe-shaped upper portion 56C, which is disposed along the width direction of the seat back 18 inside the upper end portion of the seat back 18 and is coupled to the upper end portions of the pair of side portions 56A and 56B, such that the back frame 56 is formed in a substantial U shape when seen from the front.

An elastically deformable back pad is attached via a back mat (both of which are not shown) to this back frame 56, and the surface of the back pad is covered by a surface material 58. It will be noted that a recessed portion 60 for preventing the seat cushion 16 from interfering with the seat back 18 when the seat cushion 16 moves between the use position and the storage position is formed in the lower end portion of the back pad.

The lower end portions of the side portions 56A and 56B of the back frame 56 are respectively disposed between the coupling plates 54 and the vertical walls 26A on both the left and right sides of the seat back 18 and are rotatably coupled to the coupling plates 54 via support rods 62 (see FIG. 5). A well-known reclining mechanism 64 is intervened between the one side portion 56A and one of the coupling plates 54, and the back frame 56 (the seat back 18) is supported on that coupling plate 54 via this reclining mechanism 64. A lever 66 is disposed in this reclining mechanism 64, and rotation of the back frame 56 (the seat back 18) with respect to the floor 14 is allowed only when this lever 66 is operated.

The seat back 18 of the above-described configuration is configured to be rotatable between an upright position (the position shown in FIG. 1 and FIG. 3) where the seat back 18 supports the back of a passenger seated on the seat cushion 16 that has been disposed in the use position and a forwardly collapsed position (the position shown in FIG. 2 and FIG. 4) where the seat back 18 is disposed in line in front of the seat cushion 16 that has been moved to the storage position. It will be noted that, in a state where the seat back 18 has been disposed in the forwardly collapsed position, the front end portion of the seat cushion 16 is inserted inside the recessed portion 60 in the seat back 18 such that the seat back 18 and the seat cushion 16 are stored continuously from front to back.

Further, the storage position of the seat cushion 16 is disposed on the lower side of the deck board 25 that configures the floor of the cargo compartment 12 as mentioned previously, and the back surface of the seat back 18 that has been disposed in the forwardly collapsed position is disposed in substantially the same height as the upper surface of the deck board 25 (see FIG. 4).

A rotating board 68 that is formed in a plate shape is rotatably coupled to the front end portion of the deck board 25 (the end portion on the seat back 18 side) via a hinge 70. This rotating board 68 is disposed upright along the back surface of the seat back 18 in a state where the seat back 18 has been disposed in the upright position. Further, this rotating board 68 is urged toward the front side of the vehicle (toward the seat back 18) by an unillustrated urging member, and when the seat back 18 is rotated toward the front side of the vehicle (toward the forwardly collapsed position), the rotating board 68 is rotated toward the front side of the vehicle together with the seat back 18. Further, this rotating board 68 is disposed so as to span the distance between the back surface of the seat back 18 and the deck board 25 in a state where the seat back 18 has been disposed in the forwardly collapsed position. Thus, the gap between the back surface of the seat back 18 and the deck board 25 is blocked off by the rotating board 68 such that a continuous floor surface is formed by the back surface of the seat back, the upper surface of the rotating board 68 and the upper surface of the deck board 25.

Next, the action of the present embodiment will be described.

In the rear seat 10 of the above-described configuration, when the seat back 18 is rotated to the forwardly collapsed position in a state where the seat cushion 16 has been moved to the storage position, the seat back 18 is disposed in line in front of the seat cushion 16 (the seat back 18 and the seat cushion 16 are stored in parallel from front to back). Consequently, the seat back 18 and the seat cushion 16 can be thinly stored in the up-down direction of the vehicle. Moreover, the storage position of the seat cushion 16 is set on the rear lower side of the use position, so the space above the storage position (the space of the cargo compartment 12 above the deck board 25) can be widely ensured.

Further, in this rear seat 10, the link member 34 is disposed along the floor 14 in a state where the seat cushion 16 has been moved to the storage position. Consequently, a situation where the link member 34 becomes an obstacle in the stored state of the seat cushion 16 can be controlled.

Moreover, in this rear seat 10, when the seat cushion 16 is disposed in the use position, the lock-use projecting portion 46 of the link member 34 fits into the cutout 44 in the ratchet 40, and rotation of the link member 34 is limited. For this reason, the seat cushion 16 can be held in the use position. Moreover, when the strap member 50 is pulled toward the front side of the vehicle in this state, the fitted state between the cutout 44 and the lock-use projecting portion 46 is released and the seat back 18 is automatically moved to the storage position by the urging force of the torsion spring 38. Consequently, the seat cushion 16 can be moved to the storage position by a simple operation.

Further, in this rear seat 10, the torque rod 34B that is disposed on the one end side of the link member 34 configures the skeleton of the seat cushion 16 together with the cushion frame 20. Consequently, the structure of the cushion frame 20 can be simplified, and a reduction in the number of parts, a reduction in weight and a reduction in cost can be achieved.

Further, the seat cushion 16 is urged toward the storage position by the torsion spring 38, one longitudinal direction end side of which is locked to the torque rod 34B and the other longitudinal direction end side of which is locked to the cushion frame 20. Consequently, the seat cushion 16 can be urged toward the storage position by a simple configuration. Moreover, the one longitudinal direction end side and the longitudinal direction intermediate portion of the torsion spring 38 are inserted (housed) inside the torque rod 34B, so the torsion spring 38 can be compactly installed.

Moreover, in this rear seat 10, the projections 30 that are disposed on both the left and right sides of the rear end portion of the cushion frame 20 move along the guide grooves 28 in the rails 26 that are disposed on both the left and right sides of the seat cushion 16 and are attached to the floor 14, whereby the movement of the rear end portion of the seat cushion 16 is guided between the use position and the storage position. In this manner, because the movement of the rear end portion of the seat cushion 16 is guided by the projections 30 and the guide grooves 28, the locus of movement of the rear end portion of the seat cushion 16 can be set to an optimum locus of movement by appropriately setting and changing the shapes of the guide grooves 28. Moreover, the rails 26 are disposed in the storage compartment 31 in which the seat cushion 16 is stored. Consequently, the rails 26 do not become an obstacle in the stored state of the seat cushion 16.

Further, in this rear seat 10, the vertical walls 26A of the rails 26 and the coupling plates 54 face each other in the left-right direction, the guide grooves 28 that guide the movement of the seat cushion 16 are formed in the vertical walls 26A (one wall), and the seat back 18 is supported on the coupling plates 54 (other wall) via the reclining mechanism 64 that is disposed between the vertical walls 26A and the coupling plates 54 (between both walls). Consequently, an appropriate disposition where there is no danger of interfering while the seat cushion 16 and the seat back 18 are in the middle of moving can be realized with little space.

Further, in this rear seat 10, the storage position of the seat cushion 16 is set on the lower side of the deck board 25 that configures the floor of the cargo compartment 12, and in a state where the seat back 18 has been disposed in the forwardly collapsed position (in a state where the cargo compartment 12 has been expanded), the floor of the cargo compartment is configured by the back surface of the seat back 18, the upper surface of the rotating board 68 and the upper surface of the deck board 25. Consequently, a situation where dirt or the like on cargo that is placed on the floor of the cargo compartment 12 adheres to the surfaces of the seat back 18 and the seat cushion 16 can be prevented or controlled.

It will be noted that, although the rear seat 10 pertaining to the above-described embodiment has been given a configuration where the seat cushion 16 is moved to the storage position by the urging force of the torsion spring 38 (urging member), the present invention is not limited to this and the urging member may also be omitted. Further, the invention may also be given a configuration where the seat cushion is automatically moved between the use position and the storage position by the driving force of a motor or the like. In this case, in the vehicular seat pertaining to the present invention, the support mechanism that supports the seat cushion is configured to include the link member (member that rotates by the movement of the seat cushion), so by giving the invention a configuration where the driving force (rotating force) of a motor or the like is transmitted to the link member, the movement of the seat cushion can be easily automated.

Further, although the rear seat 10 pertaining to the above-described embodiment has been given a configuration where the link member 34 is disposed with the torque rod 34B that configures the skeleton of the cushion frame 20, the present invention is not limited to this and may also be given a configuration where the torque rod 34B is omitted. In this case, the configuration becomes one where the pair of arm portions 34A of the link member 34 are rotatably coupled to the pair of extension portions 20A and 20B of the cushion frame 20.

Moreover, although the rear seat 10 pertaining to the above-described embodiment has been given a configuration where part of the torsion spring 38 (urging member) is inset in the torque rod 34B of the link member 34, the present invention is not limited to this, and the disposition of the urging member can be appropriately set and changed.

Further, although the rear seat 10 pertaining to the above-described embodiment has been given a configuration where the moving direction of the rear end portion of the seat cushion 16 is guided by the rails 26 that include the guide grooves 28, the present invention is not limited to this and may also be given a configuration where the moving direction of the rear end portion of the seat cushion 16 is guided by link members or rail-shaped members.

Moreover, in the above-described embodiment, a case has been described where the present invention is applied with respect to the rear seat 10 in the rearmost portion of a so-called van type or minivan type of automobile, but the present invention is not limited to this and can also be applied with respect to seats of other types of automobiles.

DESCRIPTION OF THE REFERENCE NUMERALS

10 Rear Seat (Vehicular Seat)
12 Cargo Compartment
14 Floor (Vehicle Body Floor)
16 Seat Cushion
18 Seat Back
20 Cushion Frame
25 Deck Board
26 Rails (Guide Members, Support Mechanism)
26A Vertical Walls (One Wall)
28 Guide Grooves
30 Projections (Support Mechanism)
34 Link Member (Support Mechanism)
34B Torque Rod (Rod Portion)
38 Torsion Spring (Urging member)
40 Ratchet (Holding Mechanism)
46 Lock-use Projecting Portion (Holding Mechanism)
54 Coupling Plates (Other Wall, Guide Members)
64 Reclining Mechanism

The invention claimed is:

1. A vehicular seat comprising:
a seat cushion for seating a passenger;
a support mechanism that is configured to include a link member, one end side of which is rotatably coupled to the seat cushion and the other end side of which is rotatably coupled to a vehicle body floor, and which supports the seat cushion with respect to the vehicle body floor, the seat cushion having a use position where a passenger is capable of sitting on the seat cushion and a storage position where the seat cushion is slid to a rear lower side of the use position, wherein a top surface of the seat cushion faces upward in both the use position and the storage position;
a seat back that is supported on the vehicle body floor such that the seat back is rotatable between an upright position where the seat back supports the back of a passenger who is seated on the seat cushion that has been disposed in the use position and a forwardly collapsed position where the seat back is disposed in line in front of the seat cushion that has been moved to the storage position; and
a holding mechanism that holds the seat cushion in the use position and is capable of releasing the seat cushion from the use position and an urging member that urges the seat cushion toward the storage position.

2. The vehicular seat according to claim 1, wherein the link member is disposed along the vehicle body floor in a state where the seat cushion has been moved to the storage position.

3. The vehicular seat according to claim 1, wherein the seat cushion includes a cushion frame that serves as a skeleton member, a rod portion that configures the skeleton of the seat cushion together with the cushion frame is disposed on the one end side of the link member, one end side of the urging member is locked to the rod portion, and the other end side of the urging member is locked to the cushion frame.

4. The vehicular seat according to claim 1, wherein the one end side of the link member is coupled to a front end portion of the seat cushion, and the support mechanism includes projections that are disposed on both left and right sides of a rear end portion of the seat cushion and guide members that are disposed on both left and right sides of the seat cushion, are attached to the vehicle body floor, and in which are formed guide grooves into which the projections fit such that the projections are relatively movable.

5. The vehicular seat according to claim 4, wherein the guide members include a pair of wall portions that face each other in a left-right direction, with the guide grooves being formed in one wall and with the seat back being supported on the other wall via a reclining mechanism that is disposed between both walls.

6. The vehicular seat according to claim 1, wherein the storage position is set on a lower side of a deck board that configures a floor of a cargo compartment.

7. A vehicular seat comprising:
a seat cushion for seating a passenger;
a support mechanism including a link member, one end and the other sides of the link member being pivoted to the seat cushion and to a vehicle body floor, respectively, for allowing the seat cushion to move in vehicle lengthwise and height directions between a use position where a passenger is capable of sitting on the seat cushion and a storage position where the seat cushion is slid to a rear lower side of the use position, wherein a top surface of the seat cushion faces upward in both the use position and the storage position; and
a seat back that is supported on the vehicle body floor such that the seat back is rotatable between an upright position where the seat back supports the back of a passenger who is seated on the seat cushion that has been disposed in the use position and a forwardly collapsed position where the seat back is disposed in line in front of the seat cushion that has been moved to the storage position.

8. The vehicular seat according to claim 7, wherein the link member is disposed along the vehicle body floor in a state where the seat cushion has been moved to the storage position.

9. The vehicular seat according to claim 7, further comprising a holding mechanism that holds the seat cushion in the use position and is capable of releasing the seat cushion from the use position and an urging member that urges the seat cushion toward the storage position.

10. The vehicular seat according to claim 9, wherein the seat cushion includes a cushion frame that serves as a skeleton member, a rod portion that configures the skeleton of the seat cushion together with the cushion frame is disposed on the one end side of the link member, one end side of the urging member is locked to the rod portion, and the other end side of the urging member is locked to the cushion frame.

11. The vehicular seat according to claim 7, wherein the one end side of the link member is coupled to a front end portion of the seat cushion, and the support mechanism includes projections that are disposed on both left and right sides of a rear end portion of the seat cushion and guide members that are disposed on both left and right sides of the seat cushion, are attached to the vehicle body floor, and in which are formed guide grooves into which the projections fit such that the projections are relatively movable.

12. The vehicular seat according to claim 9, wherein the guide members include a pair of wall portions that face each other in a left-right direction, with the guide grooves being formed in one wall and with the seat back being supported on the other wall via a reclining mechanism that is disposed between both walls.

13. The vehicular seat according to claim 7, wherein the storage position is set on a lower side of a deck board that configures a floor of a cargo compartment.

14. The vehicular seat according to claim 1, wherein the seat cushion moves into the storage position independently of the movement of the seat back into the forwardly collapsed position.

15. The vehicular seat according to claim 7, wherein the seat cushion moves into the storage position independently of the movement of the seat back into the forwardly collapsed position.

* * * * *